(12) United States Patent
Tang

(10) Patent No.: US 11,212,704 B2
(45) Date of Patent: Dec. 28, 2021

(54) METHOD AND DEVICE FOR TRANSMITTING DATA

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 36 days.

(21) Appl. No.: 16/614,344

(22) PCT Filed: May 19, 2017

(86) PCT No.: PCT/CN2017/085057
§ 371 (c)(1),
(2) Date: Nov. 15, 2019

(87) PCT Pub. No.: WO2018/209675
PCT Pub. Date: Nov. 22, 2018

(65) Prior Publication Data
US 2020/0154314 A1    May 14, 2020

(51) Int. Cl.
*H04W 28/06* (2009.01)
(52) U.S. Cl.
CPC ................ *H04W 28/065* (2013.01)
(58) Field of Classification Search
None
See application file for complete search history.

(56) References Cited

U.S. PATENT DOCUMENTS 7,400,893 B2   7/2008  Yi
8,260,287 B2   9/2012  Yi
(Continued)

FOREIGN PATENT DOCUMENTS

CN    101001131 A    7/2007
CN    101039170 A    9/2007
(Continued)

OTHER PUBLICATIONS

Nokia et al: "SN for RLC UM", 3GPP TSG-RAN WG2, Meeting #97bis, Spokane, USA, Apr. 3-7, 2017, R2-1704274 R2-1700813, XP051263560, pp. 1-2 (Apr. 3-7, 2017). (Year: 2017).*
(Continued)

*Primary Examiner* — Tri H Phan
(74) *Attorney, Agent, or Firm* — Ladas & Parry, LLP

(57) ABSTRACT

The present application provides a method and device for transmitting data, the method comprising: generating a target RLC PDU, the data field of the RLC PDU including only one complete RLC SDU or including only one cutting segment of a complete RLC SDU. If the data field of the RLC PDU includes only the complete RLC SDU, the RLC PDU does not include a sequence number (SN); if the data field of the RLC PDU includes only one cutting segment of the complete RLC SDU, the target RLC PDU include the SN; and the value of the SN included in the target RLC PDU is the same as the value of the SN included in the RLC PDU including other cutting segments of the complete RLC SDU. The method for transmitting data of the present application can reduce air interface transmission overhead.

12 Claims, 3 Drawing Sheets

(56) References Cited

U.S. PATENT DOCUMENTS

| | | | |
|---|---|---|---|
| 8,331,399 B2* | 12/2012 | Meylan | H04L 1/008 370/466 |
| 8,744,433 B2 | 6/2014 | Yi | |
| 9,072,006 B2 | 6/2015 | Yi | |
| 10,623,991 B2* | 4/2020 | Jin | H04W 76/27 |
| 10,701,588 B2* | 6/2020 | Turtinen | H04W 24/04 |
| 10,999,890 B2* | 5/2021 | Quan | H04L 5/0044 |
| 2004/0033801 A1 | 2/2004 | Yi | |
| 2007/0253447 A1 | 11/2007 | Jiang | |
| 2008/0049754 A1 | 2/2008 | Kim | |
| 2008/0261583 A1 | 10/2008 | Yi | |
| 2009/0104924 A1 | 4/2009 | Yi | |
| 2009/0116428 A1 | 5/2009 | Yi | |
| 2017/0026303 A1 | 1/2017 | Raniere | |
| 2017/0078890 A1 | 3/2017 | Zhu et al. | |
| 2019/0215902 A1* | 7/2019 | Tang | H04W 28/06 |
| 2020/0015118 A1* | 1/2020 | Sebire | H04L 69/22 |
| 2020/0077300 A1* | 3/2020 | Xu | H04W 80/02 |

FOREIGN PATENT DOCUMENTS

| | | |
|---|---|---|
| CN | 101039228 A | 9/2007 |
| CN | 101222484 A | 7/2008 |
| CN | 101553009 A | 10/2009 |
| CN | 101983521 A | 3/2011 |
| CN | 106664312 A | 5/2017 |
| JP | 2008048326 A | 2/2008 |
| KR | 20060115289 A | 11/2006 |
| KR | 20070105931 A | 10/2007 |
| KR | 20080085694 A | 9/2008 |
| RU | 2289204 C2 | 12/2006 |

OTHER PUBLICATIONS

Xiaomi: "Consideration on RLC UM functionality", 3GPP Draft: R2-1702526 Consideration on RLC UM Functionality, 3rd Generation Partnership Project (3GPP), Mobilecompetence Centre ; 650, Route Des Lucioles: F-06921 Sophia-Antipolis Cedex France vol. RAN WG2, No. Spokane, USA; Apr. 3, 2017Apr. 7, 2017 Mar. 24, 2017 (Mar. 24, 2017), XP051253190, Retrieved from the Internet: URL: http://www.3gpp.org/ftp/tsg-ran/WG2 RL2/Docs/ [retrieved on Mar. 24, 2017] p. 1-p. 2.

Ericsson: "L2 enhancements: draft CR to RLC" 3GPP Draft; Draft R2-070385 L2DATARATES CRTO RLC, 3rd Generation Partnership Project(3GPP), Mobile Competence Centre ; 650, Route Des Lucioles: F-06921Sophia-Antipolis Cedex: France vol. RAN WG2, No. Sorrento, Italy;Jan. 22, 2007, Jan. 22, 2007 (Jan. 22, 2007), XP050133112, [ retrieved on Jan. 22, 2007] pp. 1, 13.

Supplementary European Search Report in the European application No. 17909719.1, dated Mar. 4, 2020.

English translation of the Written Opinion of the International Search Authority in the international application No. PCT/CN2017/085057, dated Jan. 12, 2018.

NTT Docomo, Inc. Email discussion report on SO segmentation. 3GPP TSG-RAN WG2 Meeting 97bis R2-1702646 Spokane, USA, Apr. 3-7, 2017.

Nokia, Alcatel-Lucent Shanghai Bell, SN for RLC UM, 3GPP TSG-RAN WG2 Meeting #97 (R2-1700813) Athens, Greece, Feb.

3, 2017 (found on Jul. 20, 2020) found in Internet at https://www.3gpp.org/DynaReport/TDocExMtg-R2-97-17054.htm.

Catt, NR RLC PDU format, 3GPP TSG-RAN WG2 Meeting #97bis (R2-1703125) Spokane, USA, Mar. 25, 2017 (found on Jul. 20, 2020) found in Internet at https://www.3gpp.org/ftp/TSG_RAN/WG2_RL2/TSGR2_97bis/Docs/.

First Office Action of the Russian application No. 2019140639, dated Jul. 21, 2020.

International Search Report in the international application No. PCT/CN2017/085057, dated Jan. 12, 2018.

Written Opinion of the International Search Authority in the international application No. PCT/CN2017/085057, dated Jan. 12, 2018.

First Office Action of the Chilean application No. 201903306, dated Dec. 18, 2020.

First Office Action of the European application No. 17909719.1, dated Feb. 9, 2021.

First Office Action of the Canadian application No. 3063947, dated Feb. 11, 2021.

First Office Action of the Indian application No. 201917052058, dated Mar. 9, 2021.

3GPP TS 36.322 V13.3.0 (Mar. 2017), 3rd Generation Partnership Project; Technical Specification Group Radio Access Network; Evolved Universal Terrestrial Radio Access (E-UTRA); Radio Link Control (RLC) protocol specification (Release 13).

3GPP TSG-RAN2 Meeting #98 R2-1704056, Hangzhou, China, May 15-19, 2017, Agenda Item: 10.3.2.3; Source: OPPO; Title: The SN of RLC UMD PDU.

3GPP TSG-RAN2 Meeting #98 R2-1705122, Hangzhou, China, May 15-19, 2017, Agenda item: 10.3.2.3; Source: Huawei, HiSilicon; Title: RLC header format.

First Office Action of the Japanese application No. 2019-563787, dated Mar. 30, 2021.

First Office Action of the Chinese application No. 201911348767.2, dated Apr. 15, 2021.

Written Opinion of the Singaporean application No. 11201910805P, dated Apr. 13, 2021.

Second Office Action of the Chilean application No. 201903306, dated Apr. 20, 2021.

Second Office Action of the Chinese application No. 201911348767.2, dated Jul. 9, 2021.

Second Office Action of the European application No. 17909719.1, dated Jun. 9, 2021.

Subsequent Examination Report of the Indian application No. 201917052058, dated Aug. 18, 2021.

First Office Action of the Korean application No. 10-2019-7036412, dated Jul. 1, 2021.

Notice of Allowance of the Korean application No. 10-2019-7036412, dated Oct. 12, 2021.

Luo Yiheng, "The Design and Implementaion of RLC Protocol on the Side of Enodeb Inside TD-LTE Protocol Stack Architecture", China's Excellent Doctoral and Master's Thesis Full-text Database (Master) Information Technology Series, May 4, 2013.

Rui Li, Mehrdad Shariat, etc. "Transport protocols behaviour study in evolving mobile networks", 2016 International Symposium on Wireless Communication Systems (ISWCS), Oct. 20, 2016.

Notice of Allowance of the Chinese application No. 201911348767.2, dated Oct. 13, 2021.

Second Office Action of the Canadian application No. 3063947, dated Oct. 22, 2021.

* cited by examiner

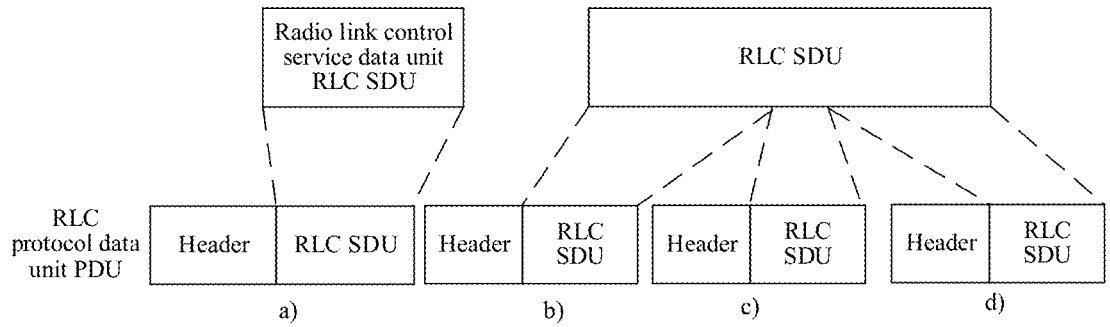
FIG. 1
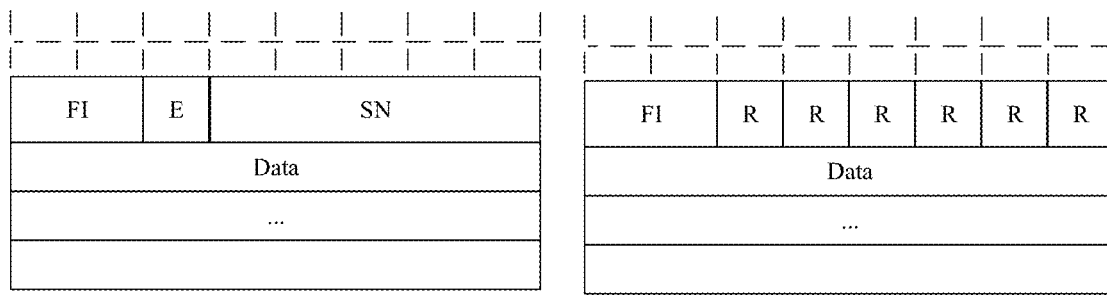
FIG. 2
| FI | E | SN |
|----|---|-----|
| Data |||
| ... |||
| FI | R | R | R | R | R | R |
|----|---|---|---|---|---|---|
| Data |||||||
| ... |||||||
FIG. 3

METHOD AND DEVICE FOR TRANSMITTING DATA

CROSS-REFERENCE TO RELATED APPLICATION

This application is the U.S. national phase of PCT/CN2017/085057, filed on May 19, 2017, the disclosure of which is incorporated by reference herein in their entireties.

TECHNICAL FIELD

Embodiments of the disclosure relate to the field of communications, and more particularly to a method and device for data transmission.

BACKGROUND

A Radio Link Control (RLC) layer of a communication system supports three modes, i.e., a Transparent Mode (TM), an Unacknowledged Mode (UM) and an Acknowledged Mode (AM). In the TM mode, an RLC entity does not perform any processing on a Service Data Unit (SDU) from a Packet Data Convergence Protocol (PDCP) layer, but may directly deliver the SDU to a Media Access Control (MAC) layer. In the UM mode, an RLC receiver does not make any feedback for a received RLC Protocol Data Unit (PDU). In the AM mode, the RLC receiver feeds back an acknowledgment for the received RLC PDU.

In a Long Term Evolution (LTE) system, in the UM mode and the AM mode, an RLC receiver needs to rank received RLC PDUs according to Sequence Numbers (SNs) in the RLC PDUs, then re-assemble the received RLC PDUs into RLC SDUs and delivers the RLC SDUs to a PDCP layer in order. However, in a New Radio (NR) system, an RLC (in the UM mode and the AM mode) layer may no longer support an SDU concatenation function, but still have an SDU segmentation function and no longer support an in-order delivery function for RLC SDUs.

Therefore, it is necessary to provide a method for data transmission, which is applicable to an NR system so as to reduce an air interface transmission overhead of the NR system.

SUMMARY

The disclosure provides a method and device for data transmission, which are applicable to an NR system so as to reduce an air interface transmission overhead of the NR system.

In a first aspect, there is provided a method for data transmission, which may include the following operations.

A target RLC PDU is generated.

Here, a data domain of the target RLC PDU includes only a complete RLC SDU or includes only a segment of a complete RLC SDU.

Here, when the data domain of the target RLC PDU includes only the complete RLC SDU, the target RLC PDU includes no SN; when the data domain of the target RLC PDU includes only the segment of the complete RLC SDU, the target RLC PDU includes an SN, and a value of the SN in the target RLC PDU is as same as a value of an SN in an RLC PDU including another segment of the complete RLC SDU.

According to the method for data transmission of the disclosure, if an RLC PDU includes a complete RLC SDU, there is no need to carry, in the RLC PDU, any SN. If the RLC PDU includes only a segment of the complete RLC SDU, there is need to carry, in the RLC PDU, an SN, and values of SNs in all RLC PDUs including different segments of the complete RLC SDU are the same. Therefore, it is unnecessary to carry, in all the RLC PDUs, the SN, and an air interface transmission overhead may further be reduced.

In combination with the first aspect, in an implementation mode of the first aspect, a length of the SN in the target RLC PDU may be independent of a transmission requirement for data carried in the segment of the complete RLC SDU.

Unlike the case in the related art that it is necessary to select a length of an SN according to a transmission requirement for the data, in the disclosure, the length of the SN is independent of the transmission requirement for the data carried in the RLC SDU. Or it can be understood that in the disclosure, the length of the SN is unique. Therefore, a device does not need to maintain header types of different PDUs, and an overhead in maintenance of the header types of different PDUs is avoided.

In combination with the first aspect and the abovementioned implementation mode thereof, in another implementation mode of the first aspect, the method may further include the following operation.

The length of the SN in the target RLC PDU is determined.

In combination with the first aspect and the abovementioned implementation modes thereof, in another implementation mode of the first aspect, the operation that the length of the SN in the target RLC PDU is determined may include the following operations.

High-layer signaling is received. Here, the high-layer signaling includes indication information used for indicating the length of the SN.

The length of the SN in the target RLC PDU is determined according to the indication information.

In an embodiment, the high-layer signaling is Radio Resource Control (RRC) signaling.

In combination with the first aspect and the abovementioned implementation modes thereof, in another implementation mode of the first aspect, the operation that the length of the SN in the target RLC PDU is determined may include the following operations.

The length of the SN in the target RLC PDU is determined according to the number of RLC SDUs to be segmented among RLC SDUs to be transmitted. Here, a maximum numerical value corresponding to the length of the SN in the target RLC PDU is greater than or equal to the number of the RLC SDUs to be segmented and the RLC SDUs to be transmitted include the complete RLC SDU.

In combination with the first aspect and the abovementioned implementation modes thereof, in another implementation mode of the first aspect, a header of the target RLC PDU may include only a fixed portion, and a length of the fixed portion may be an integral multiple of 8 bits.

In a second aspect, there is provided a method for data transmission, which may include the following operations.

A target RLC PDU is received.

Responsive to determining that a data domain of the target RLC PDU includes only a complete RLC SDU, the RLC PDU is re-assembled, here, the target RLC PDU includes no SN.

Responsive to determining that the data domain of the target RLC PDU includes only a segment of the complete RLC SDU, the complete RLC SDU is assembled according to a value of an SN in the RLC PDU, here, the value of the SN in the target RLC PDU is as same as a value of an SN in an RLC PDU including another segment of the complete RLC SDU.

According to the method for data transmission of the disclosure, if a data domain of an RLC PDU received by a receiver device includes only a complete RLC SDU, the RLC PDU is directly re-assembled. If the data domain of the RLC PDU received by the receiver device includes only a segment of the complete RLC SDU, the complete RLC SDU is assembled according to a value of an SN in the RLC PDU. Therefore, it is unnecessary for a sender device to carry the SN in all RLC PDUs, and an air interface transmission overhead may further be reduced.

In combination with the second aspect, in an implementation mode of the second aspect, a length of the SN in the target RLC PDU may be independent of a transmission requirement for data carried in the segment of the target RLC PDU.

In combination with the second aspect and the above-mentioned implementation mode thereof, in another implementation mode of the second aspect, a header of the target RLC PDU may include only a fixed portion, and a length of the fixed portion may be an integral multiple of 8 bits.

In a third aspect, there is provided a device, which is configured to execute the method in the first aspect or any possible implementation mode of the first aspect. Specifically, the device includes functional modules configured to execute the method in the first aspect or any possible implementation mode of the first aspect.

In a fourth aspect, there is provided a device, which is configured to execute the method in the second aspect or any possible implementation mode of the second aspect. Specifically, the device includes functional modules configured to execute the method in the second aspect or any possible implementation mode of the second aspect.

In a fifth aspect, there is provided a device, which includes a processor, a memory and a transceiver. The processor, the memory and the transceiver communicate with one another through an internal connection path to transmit at least one of control signals or data signals to enable the device to execute the method in the first aspect or any possible implementation mode of the first aspect.

In a sixth aspect, there is provided a device, which includes a processor, a memory and a transceiver. The processor, the memory and the transceiver communicate with one another through an internal connection path to transmit at least one of control signals or data signals to enable the device to execute the method in the second aspect or any possible implementation mode of the second aspect.

In a seventh aspect, there is provided a computer-readable medium, which is configured to store a computer program, the computer program includes an instruction configured to execute the method in the first aspect or any possible implementation mode of the first aspect.

In an eighth aspect, there is provided a computer-readable medium, which is configured to store a computer program, the computer program includes an instruction configured to execute the method in the second aspect or any possible implementation mode of the first aspect.

In a ninth aspect, there is provided a computer program product including an instruction. When a computer runs the instruction of the computer program product, the computer executes the method for data transmission in the first aspect or any possible implementation mode of the first aspect. Specifically, the computer program product may be run on the device in the third aspect or the fifth aspect.

In a tenth aspect, there is provided a computer program product including an instruction. When a computer runs the instruction of the computer program product, the computer executes the method for data transmission in the second aspect or any possible implementation mode of the second aspect. Specifically, the computer program product may be run on the device in the fourth aspect or the sixth aspect.

BRIEF DESCRIPTION OF DRAWINGS

FIG. 1 is a diagram of an RLC PDU according to an embodiment of the disclosure.

FIG. 2 is a flowchart of a method for data transmission according to an embodiment of the disclosure.

FIG. 3 is a diagram of an RLC PDU according to another embodiment of the disclosure.

DETAILED DESCRIPTION

Figure 4:
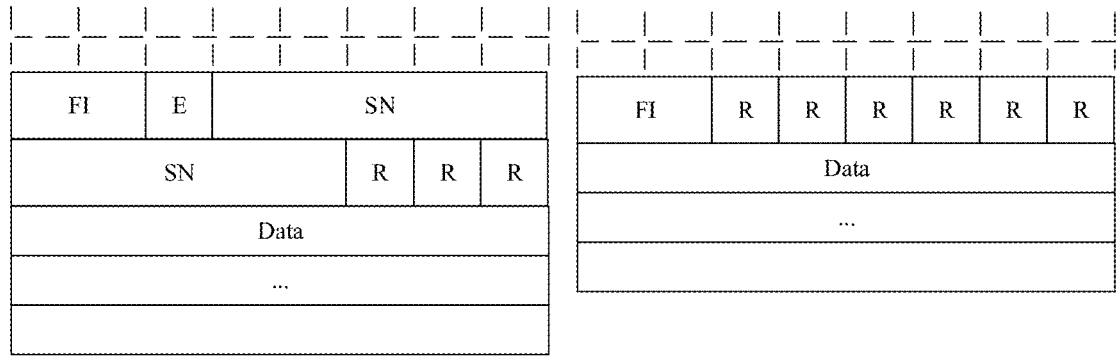
FIG. 4 is a diagram of an RLC PDU according to yet another embodiment of the disclosure.

The technical solutions in the embodiments of the disclosure will be clearly and completely described below in combination with the drawings in the embodiments of the disclosure.

It is to be understood that the technical solutions of the embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, LTE Time Division Duplex (TDD), a Universal Mobile Telecommunication System (UMTS) or a Worldwide Interoperability for Microwave Access (WiMAX) communication system, a 5th-Generation (5G) system or an NR system.

In the embodiments of the disclosure, a sender device may be a network device or a terminal device, and a receiver device may be the terminal device or the network device. When the sender device is the network device, the receiver device is the terminal device; and when the sender device is the terminal device, the receiver device is the network device.

In the embodiments of the disclosure, the terminal device may include, but not limited to, a Mobile Station (MS), a mobile terminal, a mobile telephone, User Equipment (UE), a handset, portable equipment, a vehicle and the like. The terminal device may communicate with one or more core networks through a Radio Access Network (RAN). For example, the terminal device may be a mobile phone (or called a "cell" phone), a computer with a wireless communication function and the like. The terminal device may also be a portable, pocket, handheld, computer-embedded or vehicle-mounted mobile device.

The network device in the embodiments of the disclosure is a device which is deployed in the RAN and which is used to provide a wireless communication function for the terminal device. The network device may be a base station, and the base station may include macro base stations, micro base stations, relay stations, access points and the like in various forms. In systems adopting different radio access technologies, a device with a base station function may have different names. For example, the device is called an Evolved NodeB (eNB or eNodeB) in an LTE network, and is called a Node B in a 3rd-Generation (3G) network and the like. The network device may also be a core network device.

In a related LTE system, a UM and AM supported by an RLC layer support concatenation and segmentation of an SDU. An RLC receiver needs to rank received RLC PDUs, then re-assemble the RLC PDUs into RLC SDUs, and delivers the RLC SDUs to a PDCP layer in order. Implementation of such functions mainly depends on values of SNs in headers of the RLC PDUs, and a sequencing window for the RLC receiver. This requires each RLC PDU in LTE to contain a SN. And different modes support different lengths of SNs.

For an LTE RLC UM, there are mainly two lengths of SNs: one is 5 bits and the other is 10 bits. The two different lengths of the SNs correspond to different service requirements. For example, the SN with the length of 5 bits is usually configured in a logical channel carrying a voice service, and the SN with the length of 10 bits is usually configured in a logical channel corresponding to a video service.

However, in an NR system, an RLC AM and an RLC UM no longer support the concatenation of the SDU, but still support the segmentation function of the SDU. This means that NR RLC PDUs will only include the following four conditions illustrated in FIG. 1: a) an RLC PDU includes a unique complete RLC SDU; b) an RLC PDU includes a segment of a unique RLC SDU, the segment is located at the front portion of the RLC SDU; c) an RLC PDU includes a segment of the unique RLC SDU, the segment is located at the middle portion of the RLC SDU; and d) an RLC PDU includes a segment of the unique RLC SDU, the segment is located at the back portion of the RLC SDU. Moreover, the NR RLC UM and the NR RLC AM no longer support an in-order delivery function for RLC SDUs.

The method for data transmission in an LTE system may bring an unnecessary air interface transmission overhead and an overhead in maintenance of header types of different PDUs. Therefore, it is necessary to provide a method for data transmission, which is applicable to an NR system so as to reduce an air interface transmission overhead of the NR system.

A method 100 for data transmission according to an embodiment of the disclosure will be described below in combination with FIG. 2 in detail. The method 100 may be performed by a sender device. As illustrated in FIG. 2, the method 100 includes the following operations.

In S110, a target RLC PDU is generated, here, a data domain of the target RLC PDU includes only a complete RLC SDU or includes only a segment of a complete RLC SDU.

If the data domain of the target RLC PDU includes only the complete RLC SDU, the target RLC PDU includes no SN.

If the data domain of the target RLC PDU includes only the segment of the complete RLC SDU, the target RLC PDU includes an SN, and a value of the SN in the target RLC PDU is as same as a value of an SN in an RLC PDU including another segment of the complete RLC SDU.

Specifically, in some embodiments, like the related communication system, the method 100 is performed by an RLC entity of the sender device. Moreover, the RLC entity may determine, according to a size of granted resources for a MAC layer and a size of the complete RLC SDU, whether the data domain of the generated RLC PDU includes the complete RLC SDU or includes the segment of the complete RLC SDU.

Furthermore, when the RLC entity assembles RLC PDUs, values of SNs in all RLC PDUs including different segments of a complete RLC SDU are the same. For example, a complete RLC SDU is segmented into three segments, i.e., a segment 1, a segment 2 and a segment 3. The segment 1 is located at the front portion of the complete RLC SDU, the segment 2 is located at the middle portion of the complete RLC SDU and the segment 3 is located at the back portion of the complete RLC SDU. The sender device needs to generate three RLC PDUs, i.e., an RLC PDU 1 of which a data domain includes the segment 1, an RLC PDU 2 of which a data domain includes the segment 2 and an RLC PDU 3 of which a data domain includes the segment 3; and values of SN fields in headers of the three RLC PDUs are the same.

In the embodiment of the disclosure, a length of the SN may be specified in advance in a protocol. Or when the sender device is a terminal device, the length of the SN may be configured by a network device through high-layer signaling. Here, the high-layer signaling may be RRC signaling. Or the length of the SN may also be determined by the sender device according to the number of RLC SDUs to be segmented among RLC SDUs to be transmitted, and a maximum numerical value corresponding to the length of the SN is greater than or equal to the number of the RLC SDUs to be segmented. For example, if the number of the RLC SDUs to be segmented is 30, it may be determined that the length of the SN is 5 bits.

Furthermore, the length of the SN is independent of a transmission requirement for data carried in the RLC SDU, or it can be understood that the length of the SN is unique. In this way, an overhead in maintenance of header types of different PDUs may be avoided.

In the embodiment, in S110, a header of the target RLC PDU includes only a fixed portion, and a length of the fixed portion is an integral multiple of 8 bits.

FIG. 3 illustrates an RLC PDU according to another embodiment of the disclosure. As illustrated in the left figure in FIG. 3, a data domain of an RLC PDU includes a segment of a complete RLC SDU, a length of an SN is 5 bits, and a fixed portion includes a Framing Info (FI) field, an Extended (E) bit field and an SN field. As illustrated in the right figure in FIG. 3, a data domain of an RLC PDU includes a complete RLC SDU, a fixed portion includes no SN field, and the fixed portion consists of an FI field and a Reserved (R) field. When a receiver device receives an RLC PDU of which a fixed portion includes an SN field, it is considered that a data domain of the RLC PDU includes a segment of a complete RLC SDU. When the receiver device receives an RLC PDU of which a fixed portion includes no SN field, it is considered that a data domain of the RLC PDU includes a complete RLC SDU; or when the receiver device receives an RLC PDU of which a fixed portion includes no SN field, it is determined, according to an indication of an FI field, that a data domain of the received RLC PDU includes a complete RLC SDU.

FIG. 4 illustrates an RLC PDU according to yet another embodiment of the disclosure. As illustrated in the left figure in FIG. 4, a data domain of an RLC PDU includes a segment of a complete RLC SDU, a length of an SN is 10 bits, and a fixed portion includes an FI field, an E bit field and an SN field. As illustrated in the right figure in FIG. 4, a data domain of an RLC PDU includes a complete RLC SDU, a fixed portion includes no SN field, and the fixed portion consists of an FI field and an R field. When the receiver device receives an RLC PDU of which a fixed portion includes an SN field, it is considered that a data domain of the RLC PDU includes a segment of a complete RLC SDU. When the receiver device receives an RLC PDU of which a fixed portion includes no SN field, it is considered that a data domain of the RLC PDU includes a complete RLC SDU; or when the receiver device receives an RLC PDU of which a fixed portion includes no SN field, it is determined, according to an indication of an FI field, that a data domain of the received RLC PDU includes a complete RLC SDU.

In the abovementioned embodiments, the receiver device determines, upon reception of an RLC PDU, whether a data domain of the received RLC PDU includes only a complete RLC SDU or includes only a segment of a complete RLC SDU. If the received RLC PDU includes the complete RLC SDU, the RLC PDU is directly re-assembled into the complete RLC SDU, and the RLC SDU is delivered to a high layer. If the data domain of the RLC PDU received by the receiver device includes only the segment of the complete RLC SDU, the complete RLC SDU is assembled according to a value of an SN in the RLC PDU, and the RLC SDU is delivered to the high layer. During specific implementation, the receiver device determines whether the currently received RLC PDU may be assembled with a previously received RLC PDU including an SN of which a value is the same as the value of the SN in the currently received RLC PDU, to obtain the complete RLC SDU. If YES, these RLC PDUs are re-assembled; if NOT, there is need to wait for other RLC PDUs. Here, a value of an SN in each of other RLC PDUs is the same as the value of the SN in the currently received RLC PDU.

The method for data transmission according to the embodiments of the disclosure is described above from a sender device side in combination with FIG. 1 to FIG. 4 in detail. A method for data transmission according to the embodiments of the disclosure will be described below from a receiver device side in combination with FIG. 5 in detail. For avoiding repetitions, related descriptions are properly omitted.

Figure 5:
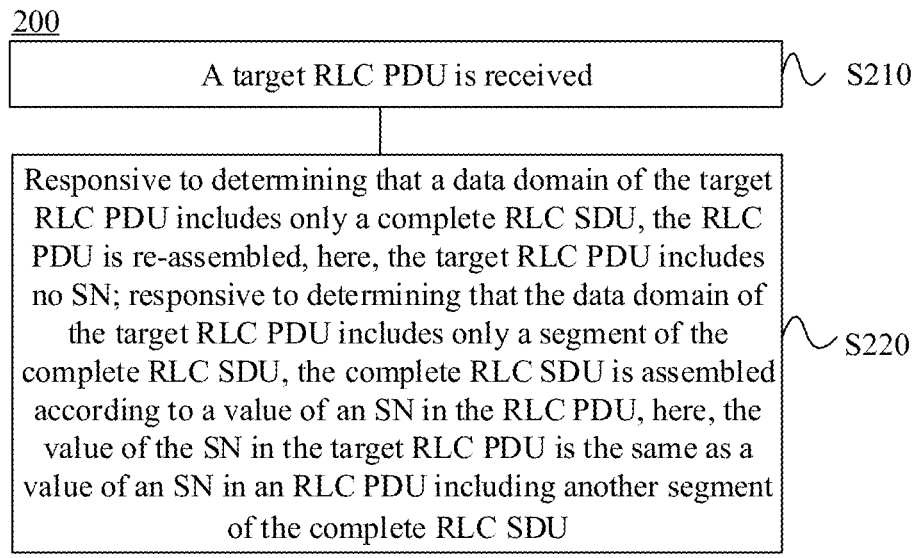
FIG. 5 is a flowchart of a method for data transmission according to another embodiment of the disclosure.

FIG. 5 illustrates a method 200 for data transmission according to another embodiment of the disclosure. The method 200 may be performed by a receiver device. As illustrated in FIG. 5, the method 200 includes the following operations.

In S210, a target RLC PDU is received.

In S220, responsive to determining that a data domain of the target RLC PDU includes only a complete RLC SDU, the RLC PDU is re-assembled, here, the target RLC PDU includes no SN;

responsive to determining that the data domain of the target RLC PDU includes only a segment of a complete RLC SDU, the complete RLC SDU is assembled according to a value of an SN in the RLC PDU, here, the value of the SN in the target RLC PDU is the same as a value of an SN in an RLC PDU including another segment of the complete RLC SDU.

According to the method for data transmission of the disclosure, if a data domain of an RLC PDU received by the receiver device includes only a complete RLC SDU, the RLC PDU is directly re-assembled. If the data domain of the RLC PDU received by the receiver device includes only a segment of the complete RLC SDU, the complete RLC SDU is assembled according to a value of an SN in the RLC PDU. Therefore, it is unnecessary for a sender device to carry, in all RLC PDUs, the SN, and an air interface transmission overhead may further be reduced.

In the embodiment of the disclosure, a length of the SN in the target RLC PDU is independent of a transmission requirement for data carried in the segment of the target RLC PDU.

In the embodiment of the disclosure, a header of the target RLC PDU includes only a fixed portion, and a length of the fixed portion is an integral multiple of 8 bits.

Figure 6:
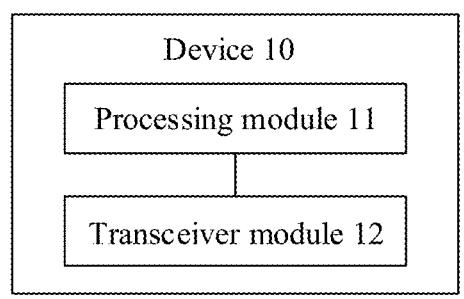
FIG. 6 is a block diagram of a device according to an embodiment of the disclosure.

The method for data transmission according to the embodiments of the disclosure is described above in combination with FIG. 1 to FIG. 5 in detail. A device according to the embodiments of the disclosure will be described below in combination with FIG. 6 in detail. As illustrated in FIG. 6, the device 10 includes a processing module 11 and a transceiver module 12.

The processing module 11 is configured to generate a target RLC PDU, here, a data domain of the target RLC PDU includes only a complete RLC SDU or includes only a segment of a complete RLC SDU.

If the data domain of the target RLC PDU includes only the complete RLC SDU, the target RLC PDU includes no SN.

If the data domain of the target RLC PDU includes only the segment of the complete RLC SDU, the target RLC PDU includes an SN, and a value of the SN in the target RLC PDU is the same as a value of an SN in an RLC PDU including another segment of the complete RLC SDU.

The transceiver module 12 is configured to send the target RLC PDU to a MAC-layer entity.

In such a manner, according to the device of the embodiment of the disclosure, when the RLC PDU is generated, if a data domain of the generated RLC PDU includes only a complete RLC SDU, it is unnecessary to carry, in the RLC PDU, any SN; if the generated RLC PDU includes only a segment of a complete RLC SDU, it is necessary to carry, in the RLC PDU, an SN, and values of SNs in all RLC PDUs including different segments of the complete RLC SDU are the same. Therefore, it is unnecessary to carry, in all the RLC PDUs, the SN, and thus an air interface transmission overhead may further be reduced.

In the embodiment of the disclosure, a length of the SN in the target RLC PDU is independent of a transmission requirement for data carried in the segment of the complete RLC SDU.

In the embodiment of the disclosure, the processing module 11 is further configured to determine the length of the SN in the target RLC PDU.

In the embodiment of the disclosure, the transceiver module 12 is further configured to receive high-layer signaling, here, the high-layer signaling includes indication information used for indicating the length of the SN.

The processing module 11 is specifically configured to determine the length of the SN in the target RLC PDU according to the indication information.

In the embodiment of the disclosure, the processing module 11 is specifically configured to determine the length of the SN in the target RLC PDU according to the number of RLC SDUs required to be segmented in RLC SDUs to be transmitted, here, a maximum numerical value corresponding to the length of the SN in the target RLC PDU is greater than or equal to the number of the RLC SDUs required to be segmented and the RLC SDUs to be transmitted include the complete RLC SDU.

In the embodiment of the disclosure, a header of the target RLC PDU includes only a fixed portion, and a length of the fixed portion is an integral multiple of 8 bits.

The device according to the embodiment of the disclosure may refer to the flows of the method 100 according to the embodiment of the disclosure. Various units/modules in the device and the other abovementioned operations and/or functions are adopted to implement the corresponding flows in the method 100 and will not be elaborated herein for simplicity.

Figure 7:
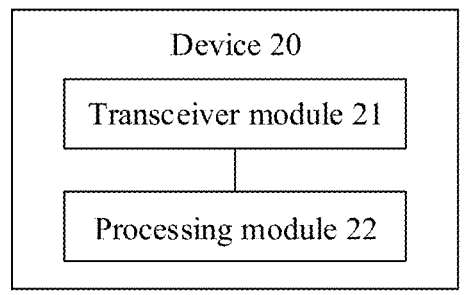
FIG. 7 is a block diagram of a device according to another embodiment of the disclosure.

FIG. 7 illustrates a device according to another embodiment of the disclosure. As illustrated in FIG. 7, the device 20 includes a transceiver module 21 and a processing module 22.

The transceiver module 21 is configured to receive a target RLC PDU.

The processing module 22 is configured to: responsive to determining that a data domain of the target RLC PDU includes only a complete RLC SDU, re-assemble the RLC PDU, here, the target RLC PDU includes no SN; responsive to determining that the data domain of the target RLC PDU includes only a segment of a complete RLC SDU, assemble the complete RLC SDU according to a value of an SN in the RLC PDU, here, the value of the SN in the target RLC PDU is the same as a value of an SN in an RLC PDU including another segment of the complete RLC SDU.

In such a manner, the device according to the embodiment of the disclosure, after an RLC PDU is received, if it is determined that a data domain of the RLC PDU includes a complete RLC SDU, the RLC PDU is directly re-assembled; if it is determined that the RLC PDU includes only a segment of a complete RLC SDU, the complete RLC SDU is assembled according to a value of an SN in the RLC PDU. Therefore, it is unnecessary for a sender device to carry, in all RLC PDUs, the SN, and thus an air interface transmission overhead may further be reduced.

In the embodiment of the disclosure, a length of the SN in the target RLC PDU is independent of a transmission requirement for data carried in the segment of the target RLC PDU.

In the embodiment of the disclosure, a header of the target RLC PDU includes only a fixed portion, and a length of the fixed portion is an integral multiple of 8 bits.

The device according to the embodiment of the disclosure may refer to the flows of the method 200 according to the embodiment of the disclosure. Various units/modules in the device and the other abovementioned operations and/or functions are adopted to implement the corresponding flows in the method 200 and will not be elaborated herein for simplicity.

Figure 8:
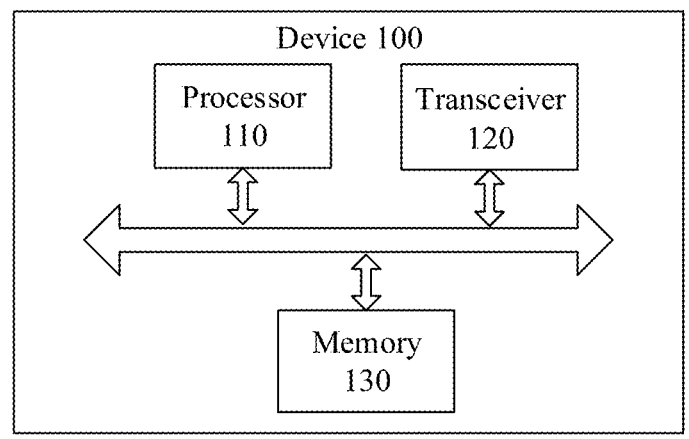
FIG. 8 is a block diagram of a device according to yet another embodiment of the disclosure.

FIG. 8 illustrates a device according to yet another embodiment of the disclosure. As illustrated in FIG. 8, the device 100 includes a processor 110 and a transceiver 120. The processor 110 is connected with the transceiver 120. In an embodiment, the device 100 further includes a memory 130. The memory 130 is connected with the processor 110. The processor 110, the memory 130 and the transceiver 120 may communicate with one another through an internal connection path. The processor 110 is configured to generate a target RLC PDU. Here, a data domain of the target RLC PDU includes only a complete RLC SDU or includes only a segment of a complete RLC SDU. Here, if the data domain of the target RLC PDU includes only the complete RLC SDU, the target RLC PDU includes no SN; if the data domain of the target RLC PDU includes only the segment of the complete RLC SDU, the target RLC PDU includes an SN and a value of the SN in the target RLC PDU is the same as a value of an SN in an RLC PDU including another segment of the complete RLC SDU.

In such a manner, according to the device of the embodiment of the disclosure, when the RLC PDU is generated, if a data domain of the generated RLC PDU only includes a complete RLC SDU, there is no need to carry, in the RLC PDU, any SN; if the generated RLC PDU only includes a segment of a complete RLC SDU, there is need to carry, in the RLC PDU, an SN, and values of SNs in all RLC PDUs including different segments of the complete RLC SDU are the same. Therefore, not all the RLC PDUs are needed to contain the SN, and thus an air interface transmission overhead may further be reduced.

The device 100 according to the embodiment of the disclosure may refer to the device 10 according to the embodiment of the disclosure. Various units/modules in the device and the other abovementioned operations and/or functions are adopted to implement the corresponding flows in the method 100 and will not be elaborated herein for simplicity.

Figure 9:
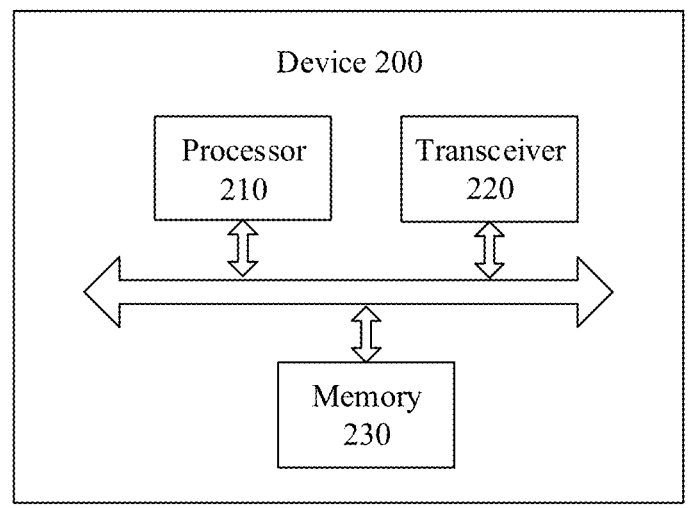
FIG. 9 is a block diagram of a device according to still another embodiment of the disclosure.

FIG. 9 is a block diagram of a device according to still another embodiment of the disclosure. As illustrated in FIG. 9, the device 200 includes a processor 210 and a transceiver 220. The processor 210 is connected with the transceiver 220. In an embodiment, the device 200 further includes a memory 230. The memory 230 is connected with the processor 210. The processor 210, the memory 230 and the transceiver 220 may communicate with one another through an internal connection path. The transceiver 220 is configured to receive a target RLC PDU. The processor 210 is configured to: responsive to determining that a data domain of the target RLC PDU includes only a complete RLC SDU, re-assemble the RLC PDU, here, the target RLC PDU includes no SN; responsive to determining that the data domain of the target RLC PDU includes only a segment of the complete RLC SDU, assemble the complete RLC SDU according to a value of an SN in the RLC PDU, here, the value of the SN in the target RLC PDU is the same as a value of an SN in an RLC PDU including another segment of the complete RLC SDU.

In such a manner, the device according to the embodiment of the disclosure, after an RLC PDU is received, if it is determined that a data domain of the RLC PDU includes a complete RLC SDU, the RLC PDU is directly re-assembled; if it is determined that the RLC PDU only includes a segment of the complete RLC SDU, the complete RLC SDU is assembled according to a value of an SN in the RLC PDU. Therefore, a sender device does not need to carry the SN in all RLC PDUs, and thus an air interface transmission overhead may further be reduced.

The device 200 according to the embodiment of the disclosure may refer to the device 20 according to the embodiment of the disclosure. Various units/modules in the device and the other abovementioned operations and/or functions are adopted to implement the corresponding flows in the method 200 and will not be elaborated herein for simplicity.

It is to be understood that the processor in the embodiment of the disclosure may be an integrated circuit chip and has a signal processing capability. In an implementation process, each operation of the method embodiment may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or other programmable logical devices, discrete gate or transistor logical device and discrete hardware component. Each method, operation and logical block diagram disclosed in the embodiments of the disclosure may be implemented or executed by the processor. The universal processor may be a microprocessor or the processor may also be any conventional processor and the like. The operations of the methods disclosed in combination with the embodiments of the disclosure may be directly embodied to be executed and completed by a hardware decoding processor or executed and completed by a combination of hardware and software modules in the decoding processor. The software module may be located in a mature storage medium in the field, such as a Random Access Memory (RAM), a flash memory, a read-only memory, a programmable read-only memory or electrically erasable programmable read-only memory and a register. The storage medium is located in a memory, and the processor reads information in the memory and completes the operations of the methods in combination with hardware.

It can be understood that the memory in the embodiment of the disclosure may be a volatile memory or a nonvolatile memory, or may include both the volatile and nonvolatile memories. The nonvolatile memory may be a Read-Only Memory (ROM), a Programmable ROM (PROM), an Erasable PROM (EPROM), an Electrically EPROM (EEPROM) or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). The memory of a system and method described in the disclosure is intended to include, but not limited to, these memories and any other proper types of memories.

An embodiment of the disclosure also provides a computer program product including an instruction. When a computer runs the instruction of the computer program product, the computer executes the methods for data transmission in the method embodiments. Specifically, the computer program product may be run on the devices.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiments and will not be elaborated herein for convenient and brief description.

In some embodiments provided by the disclosure, it is to be understood that the disclosed system, device and method may be implemented in other manners. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection of the devices or the units through some interfaces, and may be electrical and mechanical or other forms.

The units described as separate parts may or may not be physically separated. And parts displayed as units may or may not be physical units, i.e., may be located in the same place, or may also be distributed to multiple network units. Part or all of the units may be selected according to a practical requirement to achieve the purpose of the solutions of the embodiments.

In addition, various functional units in each embodiment of the disclosure may be integrated into a processing unit, or each unit may also physically exist independently, or two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the related art or part of the technical solutions may be embodied in form of software product. The computer software product is stored in a storage medium and includes a plurality of instructions configured to enable a computer device (which may be a personal computer, a server, a network device or the like) to execute all or part of the operations of the method in each embodiment of the disclosure. The abovementioned storage medium includes various media capable of storing program codes, such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for data transmission, performed by a sender device, the method comprising:
   generating a target Radio Link Control (RLC) Protocol Data Unit (PDU), the target RLC PDU comprising a header and the header comprising only a fixed portion; wherein
   when a data domain of the target RLC PDU comprises only a complete RLC Service Data Unit (SDU), the fixed portion does not comprises a Sequence Number (SN) field;
   when the data domain of the target RLC PDU comprises only a segment of a complete RLC SDU, the fixed portion comprises the SN field, and a value of the SN field in the fixed portion of the header of the target RLC PDU is the same as a value of an SN field in a fixed portion of a header of an RLC PDU comprising another segment of the complete RLC SDU, wherein a length of the SN field is determined according to a number of RLC SDUs to be segmented among RLC SDUs to be transmitted, a maximum numerical value corresponding to the length of the SN field is greater than or equal to the number of the RLC SDUs to be segmented, and the RLC SDUs to be transmitted comprise the complete RLC SDU; and
   sending the target RLC PDU to a Media Access Control (MAC)-layer entity.

2. The method of claim 1, wherein when the fixed portion comprises the SN field, the length of the SN field in the target RLC PDU is independent of a transmission requirement for data carried in the segment of the complete RLC SDU.

3. The method of claim 1, wherein a length of the fixed portion is an integral multiple of 8 bits.

4. A method for data transmission, performed by a receiver device, the method comprising:
receiving a target Radio Link Control (RLC) Protocol Data Unit (PDU), the target RLC PDU comprising a header and the header comprising only a fixed portion; and
when the fixed portion does not comprise a Sequence Number (SN) field, determining that a data domain of the target RLC PDU comprises only a complete RLC Service Data Unit (SDU), and directly re-assembling the target RLC PDU without assembling the target RLC PDU;
when the fixed portion comprises the SN field, determining that the data domain of the target RLC PDU comprises only a segment of a complete RLC SDU, and assembling the complete RLC SDU according to a value of the SN field, wherein the value of the SN field in the fixed portion of the header of the target RLC PDU is the same as a value of an SN field in a fixed portion of a header of an RLC PDU comprising another segment of the complete RLC SDU.

5. The method of claim 4, wherein when the fixed portion comprises the SN field, a length of the SN field in the target RLC PDU is independent of a transmission requirement for data carried in the segment of the target RLC PDU.

6. The method of claim 4, wherein a length of the fixed portion is an integral multiple of 8 bits.

7. A sender device, comprising:
a processor, configured to generate a target Radio Link Control (RLC) Protocol Data Unit (PDU), the target RLC PDU comprising a header and the header comprising only a fixed portion;
wherein
when a data domain of the target RLC PDU comprises only a complete RLC Service Data Unit (SDU), the fixed portion does not comprise a Sequence Number (SN) field;
when the data domain of the target RLC PDU comprises only a segment of a complete RLC SDU, the fixed portion comprises the SN field, and a value of the SN field in the fixed portion of the header of the target RLC PDU is the same as a value of an SN field in a fixed portion of a header of an RLC PDU comprising another segment of the complete RLC SDU, wherein a length of the SN field is determined according to a number of RLC SDUs to be segmented among RLC SDUs to be transmitted, a maximum numerical value corresponding to the length of the SN field is greater than or equal to the number of the RLC SDUs to be segmented, and the RLC SDUs to be transmitted comprise the complete RLC SDU; and
a transceiver, configured to send the target RLC PDU to a Media Access Control (MAC)-layer entity.

8. The sender device of claim 7, wherein when the fixed portion comprises the SN field, the length of the SN field in the target RLC PDU is independent of a transmission requirement for data carried in the segment of the complete RLC SDU.

9. The sender device of claim 7, wherein a length of the fixed portion is an integral multiple of 8 bits.

10. A receiver device, comprising:
a transceiver, configured to receive a target Radio Link Control (RLC) Protocol Data Unit (PDU), the target RLC PDU comprising a header and the header comprising only a fixed portion; and
a processor, configured to:
when the fixed portion does not comprise a Sequence Number (SN) field, determine that a data domain of the target RLC PDU comprises only a complete RLC Service Data Unit (SDU), and directly re-assemble the target RLC PDU without assembling the target RLC PDU;
when the fixed portion comprises the SN field, determine that the data domain of the target RLC PDU comprises only a segment of a complete RLC SDU, and assemble the complete RLC SDU according to a value of the SN field, wherein the value of the SN field in the fixed portion of the header of the target RLC PDU is the same as a value of an SN field in a fixed portion of a header of an RLC PDU comprising another segment of the complete RLC SDU.

11. The receiver device of claim 10, wherein when the fixed portion comprises the SN field, a length of the SN field in the target RLC PDU is independent of a transmission requirement for data carried in the segment of the target RLC PDU.

12. The receiver device of claim 10, wherein a length of the fixed portion is an integral multiple of 8 bits.

* * * * *